United States Patent [19]

Gold

[11] Patent Number: 5,524,954
[45] Date of Patent: Jun. 11, 1996

[54] VAN REAR COMPARTMENT CLOSURE

[76] Inventor: Peter Gold, 389 Peninsula Blvd., Hempstead, N.Y. 11550

[21] Appl. No.: 271,753

[22] Filed: Jul. 7, 1994

[51] Int. Cl.⁶ .................................................. B62D 25/24
[52] U.S. Cl. .................... 296/106; 49/163; 49/170; 49/171; 296/56; 296/146.8; 296/146.16; 296/201
[58] Field of Search .............. 296/106, 146.8, 296/146.16, 56, 201, 26; 49/170, 171, 169, 48, 168, 163; 224/42.21, 42.26, 509

[56] References Cited

U.S. PATENT DOCUMENTS

| | | | |
|---|---|---|---|
| 2,658,791 | 11/1953 | Anderson | 49/170 X |
| 4,561,575 | 12/1985 | Jones | 224/42.21 |
| 4,869,409 | 9/1989 | Wright | 224/42.21 |
| 4,946,084 | 8/1990 | Britto | 224/42.26 X |
| 4,971,237 | 11/1990 | Davis | 224/42.06 |
| 5,094,374 | 3/1992 | Lee | 224/42.21 |
| 5,186,371 | 2/1993 | Jozefczak et al. | 224/42.21 |
| 5,209,543 | 5/1993 | Harkins, Jr. | 296/26 X |

*Primary Examiner*—David M. Mitchell
*Assistant Examiner*—Kia M. Robinson

[57] ABSTRACT

A two-window closure for the rear opening of a van to obviate a spare tire obstruction in which one window is coextensive with the spare tire and remains in place unless the spare tire is traversed out of the way, but the other window being coextensive with the remainder of the window opening can be opened without traversing the spare tire and thus provides the user with access into the rear of the van.

1 Claim, 1 Drawing Sheet

VAN REAR COMPARTMENT CLOSURE

The present invention relates generally to rear window improvements for a van wherein, more particularly, the rear compartment thereof commonly used for supermarket packages and the like is made more accessible to the user.

EXAMPLES OF THE PRIOR ART

The van or so-called sports utility vehicle, e.g. in U.S. Pat. No. 5,094,374 issued to Lee on Mar. 10, 1992 to which the rear window improvements hereof are advantageously applied, requires a lateral traverse of a spare tire carrier in order to obtain access into the rear compartment of the van.

The aforesaid operational mode is also necessary for the "Spare Tire Carrier" of U.S. Pat. No. 5,186,371 issued to Jozefczak et al. on Feb. 16, 1993, and even if clearing the obstructing spare tire is not a lateral traverse, some equivalent spare tire movement is nevertheless required as exemplified by U.S. Pat. No. 4,561,575 issued to Jones for "Swing Away Tire Carrier And Hitch" on Dec. 31, 1985 and U.S. Pat. No. 4,971,237 issued to Davis for "Rotatable Spare Tire Holding Apparatus" on Nov. 20, 1990.

Broadly, it is an object of the present invention to provide a user-accessible rear van compartment overcoming the foregoing and other shortcomings of the prior art.

More particularly, it is an object to obviate the prior art obstruction of the spare tire to use of the rear van compartment, all as will be better understood as the description proceeds.

The description of the invention which follows, together with the accompanying drawings should not be construed as limiting the invention to the example shown and described, because those skilled in the art to which this invention appertains will be able to devise other forms thereof within the ambit of the appended claims.

Figure 1:
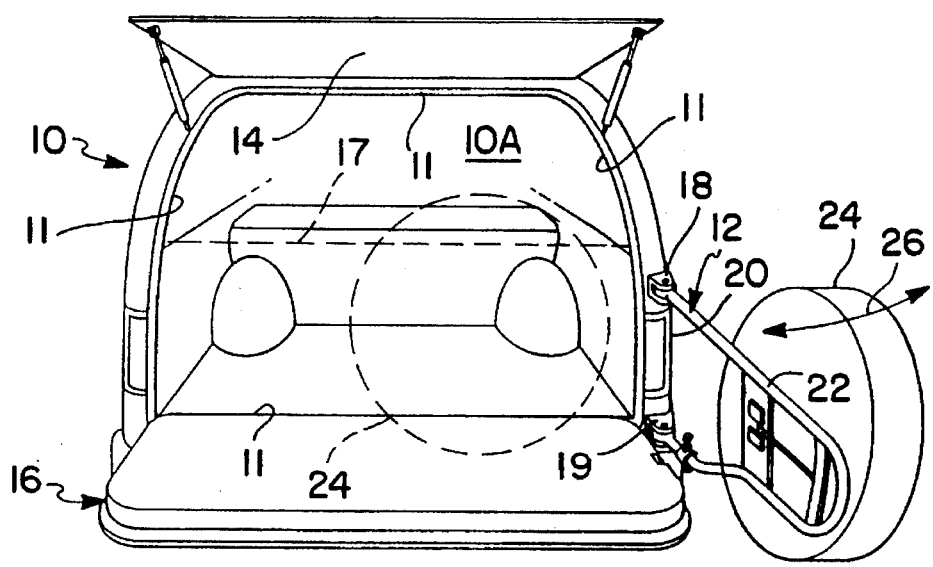
FIG. 1 is a rear elevational view of a prior art construction of a van-type vehicle to which the invention is advantageously applied.

Illustrated as part of a prior art construction in FIG. 1 is a van-type vehicle 10 of a type having top, bottom and opposite side panels presenting edges, collectively designated 11, bounding a rear opening into a rear compartment 10A of the vehicle that is closed by an ascending pivotally mounted tailgate 16 and a descending pivotally mounted rear window 14 joining at a horizontally oriented interface 17. As part of this prior art construction is a spare tire carrier 22 and spare tire 24 mounted on hinge members 18 and 19 at the vehicle corner 20 to swing in opposite directions, as noted by the double headed arrow 26, between the positions of movement illustrated in phantom and full line perspective.

When the carrier 22 is closed against the closed window 14 and tailgate 16, the spare tire 24 is in the path of the ascending pivotal traverse of window 14, as noted by the phantom line perspective of spare tire 24, so that even if not needed for a tire replacement, the carrier 22 must be swung clear of the rear of the vehicle, in order to open the prior art window 14. A user is thus required to unlock and traverse the carrier 22 in order to gain access into the rear compartment 10A. This is difficult for supermarket shoppers burdened with packages, van users unfamiliar with the operational requirements of the carrier, and similarly dictated circumstances demonstrating this shortcoming of the prior art.

Figure 2:
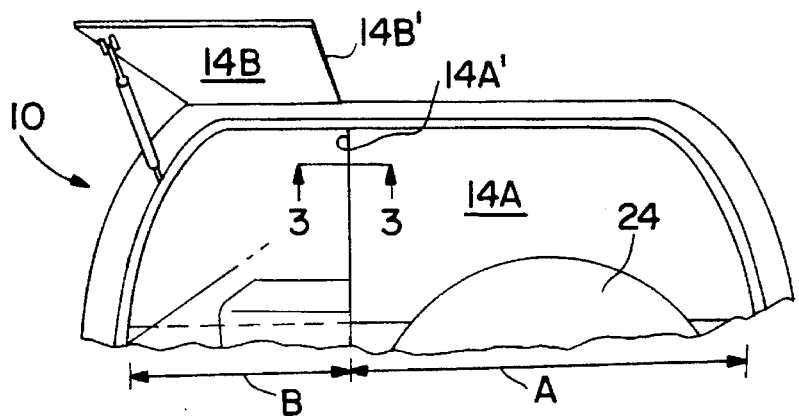
FIG. 2 is a partial rear elevational view patterned after FIG. 1 but illustrating the improvements in the rear window according to the present invention.
Figure 3:
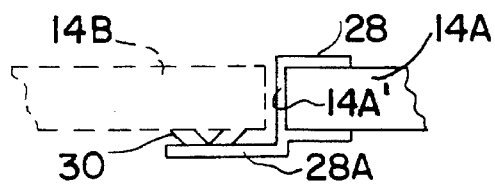
FIG. 3 is a sectional view, on an enlarged scale, as taken along line 3—3 of FIG. 2.

As illustrated in FIGS. 2 and 3, the aforesaid is obviated according to the present invention by embodying the single prior art window 14 as a first window 14A of a size selected to be coextensive only in the area A of the rear opening occupied by the spare tire 24 and a second independently operated window 14B of a size selected to be coextensive only in the remaining area B of the van rear-opening. Thus, without traversing the carrier 22, in use window 14B is unlocked and ascends clear of the spare tire 24 into its open condition illustrated in FIG. 2 thus providing the user with access into the van rear compartment 10A.

The clearance between the confronting edges 14A', 14B' of the windows 14A, 14B can be weather-insulated in any appropriate manner. In a preferred embodiment, a shaped channel 28 is disposed in gripping engagement along the window edge 14A' and presents a laterally extending leg 28A beneath window 14B so that contact can be established with an insulation strip 30.

While the rear two-window opening into the van 10 herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. For a van-type vehicle of a type having a top panel, a bottom panel, and opposite side panels cooperating to bound an interior compartment in the rear of said vehicle having rearward edges of said panels correspondingly bounding a rear opening into said compartment, a tailgate pivotally mounted to serve as a closure for a bottom portion of said rear opening movable from a rear opening closing position through an opening descending pivotal traverse, a rear window pivotally mounted to serve as a closure for an upper portion of said rear opening movable from an upper portion rear opening closing position through an opening ascending pivotal traverse, and a spare tire carrier pivotally mounted adjacent an end of said tailgate to partake of a lateral traverse and having supported thereon a spare tire of a diameter of an extent extending into said ascending opening path of movement of said rear window so as to require said lateral traverse of said spare tire carrier incident to said opening of said rear window, an improved rear upper opening closure wherein said window comprises a pivotally mounted first window of a size selected to be at least coextensive with the area of said upper portion rear opening adjacent which said spare tire exists and having an inner vertically oriented edge, an edge-engaging grip means disposed on said first window inner edge having a weather seal means extending laterally therefrom, and a pivotally mounted second window of a size selected to be coextensive only with a remaining area of said upper portion rear opening in a clearance position in relation to said spare tire, whereby access into said rear vehicle compartment is through the opening of said second window without any lateral traverse of said spare tire carrier.

\* \* \* \* \*